United States Patent
Kameya

(10) Patent No.: US 8,909,686 B2
(45) Date of Patent: Dec. 9, 2014

(54) DISCRETE FOURIER CALCULATION DEVICE, RADIO COMMUNICATION DEVICE, AND DISCRETE FOURIER CALCULATION METHOD

(75) Inventor: Jun Kameya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 266 days.

(21) Appl. No.: 13/534,168

(22) Filed: Jun. 27, 2012

(65) Prior Publication Data

US 2013/0039165 A1 Feb. 14, 2013

(30) Foreign Application Priority Data

Aug. 9, 2011 (JP) ................................. 2011-174418

(51) Int. Cl.
| | | |
|---|---|---|
| G06F 17/14 | (2006.01) | |
| H04L 27/26 | (2006.01) | |
| H04L 27/36 | (2006.01) | |

(52) U.S. Cl.
CPC ............ *G06F 17/141* (2013.01); *H04L 27/263* (2013.01); *H04L 27/2636* (2013.01); *H04L 27/2697* (2013.01); *H04L 27/362* (2013.01)
USPC .......................................... 708/405; 708/403

(58) Field of Classification Search
None
See application file for complete search history.

(56) References Cited

U.S. PATENT DOCUMENTS

| | | | | |
|---|---|---|---|---|
| 6,061,705 | A * | 5/2000 | Hellberg ....................... | 708/408 |
| 2006/0248135 | A1* | 11/2006 | Cousineau et al. ........... | 708/404 |
| 2009/0160576 | A1* | 6/2009 | Dent ............................. | 333/139 |
| 2010/0306298 | A1* | 12/2010 | Cenciotti et al. ............. | 708/402 |

FOREIGN PATENT DOCUMENTS

| | | |
|---|---|---|
| JP | 08-305684 | 11/1996 |
| JP | 2001-325246 | 11/2001 |
| JP | 2006-60433 | 3/2006 |
| JP | 2010-152768 | 7/2010 |

* cited by examiner

Primary Examiner — Michael D Yaary
(74) Attorney, Agent, or Firm — Fujitsu Patent Center

(57) ABSTRACT

A discrete Fourier calculation device includes a twiddle factor table storage unit that stores therein a twiddle factor table that associates twiddle factors with phases of the corresponding twiddle factors; a correction value specifying unit that specifies first and second correction values for correcting a phase of an input signal in accordance with an amplitude of the input signal; a generating unit that corrects the phase of the input signal by using the specified first and second correction values to generate first and second phases; an addition unit that adds an arbitrary phase corresponding to an arbitrary twiddle factor stored in the twiddle factor table, to each of the generated first and second phases; and a rotation calculation unit that acquires, from the twiddle factor table, first and second twiddle factors corresponding to the first and second phases and sums the acquired first and second twiddle factors.

7 Claims, 15 Drawing Sheets

| ADDRESS | I VALUE | Q VALUE |
|---|---|---|
| 0 | 1.00000 | 0.00000 |
| 1 | 0.99999 | 0.00524 |
| ⋮ | ⋮ | ⋮ |
| 300 | 0.00000 | 1.00000 |
| ⋮ | ⋮ | ⋮ |
| 590 | -0.99863 | 0.05234 |
| ⋮ | ⋮ | ⋮ |
| 910 | 0.05234 | -0.99863 |
| ⋮ | ⋮ | ⋮ |
| 1199 | 0.99999 | -0.00524 |

| SIGNAL POINT | AMPLITUDE | PHASE (DEGREE) | ADDRESS OFFSET |
|---|---|---|---|
| 1 | 1 | 135 | 450 |
| 2 | 1 | 45 | 150 |
| 1 | 1 | 225 | 750 |
| 4 | 1 | 315 | 1050 |

| SIGNAL POINT | AMPLITUDE | PHASE (DEGREE) | ADDITION PHASE (DEGREE) | ADDRESS OFFSET |
|---|---|---|---|---|
| 1 | $3\sqrt{5}$ | 135 | ±47.87 | 450±160 |
| 2 | 1 | 108.43 | ±60 | 361±200 |
| 1 | 1 | 71.57 | ±60 | 239±200 |
| 4 | $3\sqrt{5}$ | 45 | ±47.87 | 150±160 |
| 5 | 1 | 161.57 | ±60 | 539±200 |
| 6 | $1\sqrt{5}$ | 135 | ±77.08 | 450±257 |
| 7 | $1\sqrt{5}$ | 45 | ±77.08 | 150±257 |
| 8 | 1 | 18.43 | ±60 | 61±200 |
| 9 | 1 | 198.43 | ±60 | 661±200 |
| 10 | $1\sqrt{5}$ | 225 | ±77.08 | 750±257 |
| 11 | $1\sqrt{5}$ | 315 | ±77.08 | 1050±257 |
| 12 | 1 | 341.57 | ±60 | 1139±200 |
| 13 | $3\sqrt{5}$ | 225 | ±47.87 | 750±160 |
| 14 | 1 | 251.57 | ±60 | 839±200 |
| 15 | 1 | 288.43 | ±60 | 961±200 |
| 16 | $3\sqrt{5}$ | 315 | ±47.87 | 1050±160 |

| SIGNAL POINT | AMPLITUDE | PHASE (DEGREE) | ADDITION PHASE (DEGREE) | ADDRESS OFFSET |
|---|---|---|---|---|
| 1 | $7\sqrt{21}$ | 135 | ±40.20 | 450±135 |
| 2 | $\sqrt{37}/\sqrt{21}$ | 125.54 | ±48.42 | 418±161 |
| 3 | $\sqrt{29}/\sqrt{21}$ | 113.20 | ±54.02 | 377±180 |
| 4 | $5/\sqrt{21}$ | 98.13 | ±56.94 | 327±190 |
| 5 | $5/\sqrt{21}$ | 81.87 | ±56.94 | 273±190 |
| 6 | $\sqrt{29}/\sqrt{21}$ | 66.80 | ±54.02 | 223±180 |
| 7 | $\sqrt{37}/\sqrt{21}$ | 54.46 | ±48.42 | 182±161 |
| 8 | $7\sqrt{21}$ | 45 | ±40.20 | 150±135 |
| 9 | $\sqrt{37}/\sqrt{21}$ | 125.53 | ±48.42 | 418±161 |
| 10 | $5/\sqrt{21}$ | 135 | ±56.94 | 450±190 |
| 11 | $\sqrt{17}/\sqrt{21}$ | 120.96 | ±63.26 | 403±211 |
| 12 | $\sqrt{13}/\sqrt{21}$ | 101.31 | ±66.83 | 338±223 |
| 13 | $\sqrt{13}/\sqrt{21}$ | 78.69 | ±66.83 | 262±223 |
| 14 | $\sqrt{17}/\sqrt{21}$ | 59.04 | ±63.26 | 197±211 |
| 15 | $5/\sqrt{21}$ | 45 | ±56.94 | 150±190 |
| 16 | $\sqrt{37}/\sqrt{21}$ | 35.54 | ±48.42 | 118±161 |
| 17 | $\sqrt{29}/\sqrt{21}$ | 15.80 | ±54.02 | 523±180 |
| 18 | $\sqrt{17}/\sqrt{21}$ | 149.04 | ±63.26 | 497±211 |
| 19 | $3/\sqrt{21}$ | 135 | ±70.89 | 450±236 |
| 20 | $\sqrt{5}/\sqrt{21}$ | 108.43 | ±75.88 | 361±253 |
| 21 | $\sqrt{5}/\sqrt{21}$ | 71.57 | ±75.88 | 239±253 |
| 22 | $3/\sqrt{21}$ | 45 | ±70.89 | 150±236 |
| 23 | $\sqrt{17}/\sqrt{21}$ | 30.96 | ±63.26 | 103±211 |
| 24 | $\sqrt{29}/\sqrt{21}$ | 23.20 | ±54.02 | 77±180 |
| 25 | $5/\sqrt{21}$ | 171.87 | ±56.94 | 573±190 |
| 26 | $\sqrt{13}/\sqrt{21}$ | 168.69 | ±66.83 | 562±223 |
| 27 | $\sqrt{5}/\sqrt{21}$ | 161.57 | ±75.88 | 539±253 |
| 28 | $1/\sqrt{21}$ | 135 | ±83.74 | 450±279 |
| 29 | $1/\sqrt{21}$ | 45 | ±83.74 | 150±279 |
| 30 | $\sqrt{5}/\sqrt{21}$ | 18.43 | ±75.88 | 61±253 |
| 31 | $\sqrt{13}/\sqrt{21}$ | 11.31 | ±66.83 | 38±223 |
| 32 | $5/\sqrt{21}$ | 8.13 | ±56.94 | 27±190 |

FIG.11B

126b

| SIGNAL POINT | AMPLITUDE | PHASE (DEGREE) | ADDITION PHASE (DEGREE) | ADDRESS OFFSET |
|---|---|---|---|---|
| 33 | $5/\sqrt{21}$ | 188.13 | ±66.83 | 627±190 |
| 34 | $\sqrt{13}/\sqrt{21}$ | 191.31 | ±66.83 | 638±223 |
| 35 | $\sqrt{5}/\sqrt{21}$ | 198.43 | ±75.88 | 661±253 |
| 36 | $1/\sqrt{21}$ | 225 | ±83.74 | 750±279 |
| 37 | $1/\sqrt{21}$ | 315 | ±83.74 | 1050±279 |
| 38 | $\sqrt{5}/\sqrt{21}$ | 341.57 | ±75.88 | 1139±253 |
| 39 | $\sqrt{13}/\sqrt{21}$ | 348.69 | ±66.83 | 1162±223 |
| 40 | $5/\sqrt{21}$ | 351.87 | ±56.94 | 1173±190 |
| 41 | $\sqrt{29}/\sqrt{21}$ | 203.20 | ±54.02 | 677±180 |
| 42 | $\sqrt{17}/\sqrt{21}$ | 210.96 | ±63.26 | 703±211 |
| 43 | $3/\sqrt{21}$ | 225 | ±70.89 | 750±236 |
| 44 | $\sqrt{5}/\sqrt{21}$ | 251.57 | ±75.88 | 839±253 |
| 45 | $\sqrt{5}/\sqrt{21}$ | 288.43 | ±75.88 | 961±153 |
| 46 | $3/\sqrt{21}$ | 315 | ±70.89 | 1050±236 |
| 47 | $\sqrt{17}/\sqrt{21}$ | 329.04 | ±63.26 | 1097±211 |
| 48 | $\sqrt{29}/\sqrt{21}$ | 336.80 | ±54.02 | 1123±180 |
| 49 | $\sqrt{37}/\sqrt{21}$ | 215.54 | ±48.42 | 718±161 |
| 50 | $5/\sqrt{21}$ | 225 | ±56.94 | 750±190 |
| 51 | $\sqrt{17}/\sqrt{21}$ | 239.04 | ±63.26 | 797±211 |
| 52 | $\sqrt{13}/\sqrt{21}$ | 258.69 | ±66.83 | 862±223 |
| 53 | $\sqrt{13}/\sqrt{21}$ | 281.31 | ±66.83 | 938±223 |
| 54 | $\sqrt{17}/\sqrt{21}$ | 300.96 | ±63.26 | 1003±211 |
| 55 | $5/\sqrt{21}$ | 315 | ±56.94 | 1050±190 |
| 56 | $\sqrt{37}/\sqrt{21}$ | 324.46 | ±48.42 | 1082±161 |
| 57 | $7/\sqrt{21}$ | 225 | ±40.20 | 750±135 |
| 58 | $\sqrt{37}/\sqrt{21}$ | 234.46 | ±48.42 | 782±161 |
| 59 | $\sqrt{29}/\sqrt{21}$ | 246.80 | ±54.02 | 823±180 |
| 60 | $5/\sqrt{21}$ | 261.87 | ±56.94 | 873±190 |
| 61 | $5/\sqrt{21}$ | 278.13 | ±56.94 | 927±190 |
| 62 | $\sqrt{29}/\sqrt{21}$ | 293.20 | ±54.02 | 977±180 |
| 63 | $\sqrt{37}/\sqrt{21}$ | 305.54 | ±48.42 | 1018±161 |
| 64 | $7/\sqrt{21}$ | 315 | ±40.20 | 1050±135 |

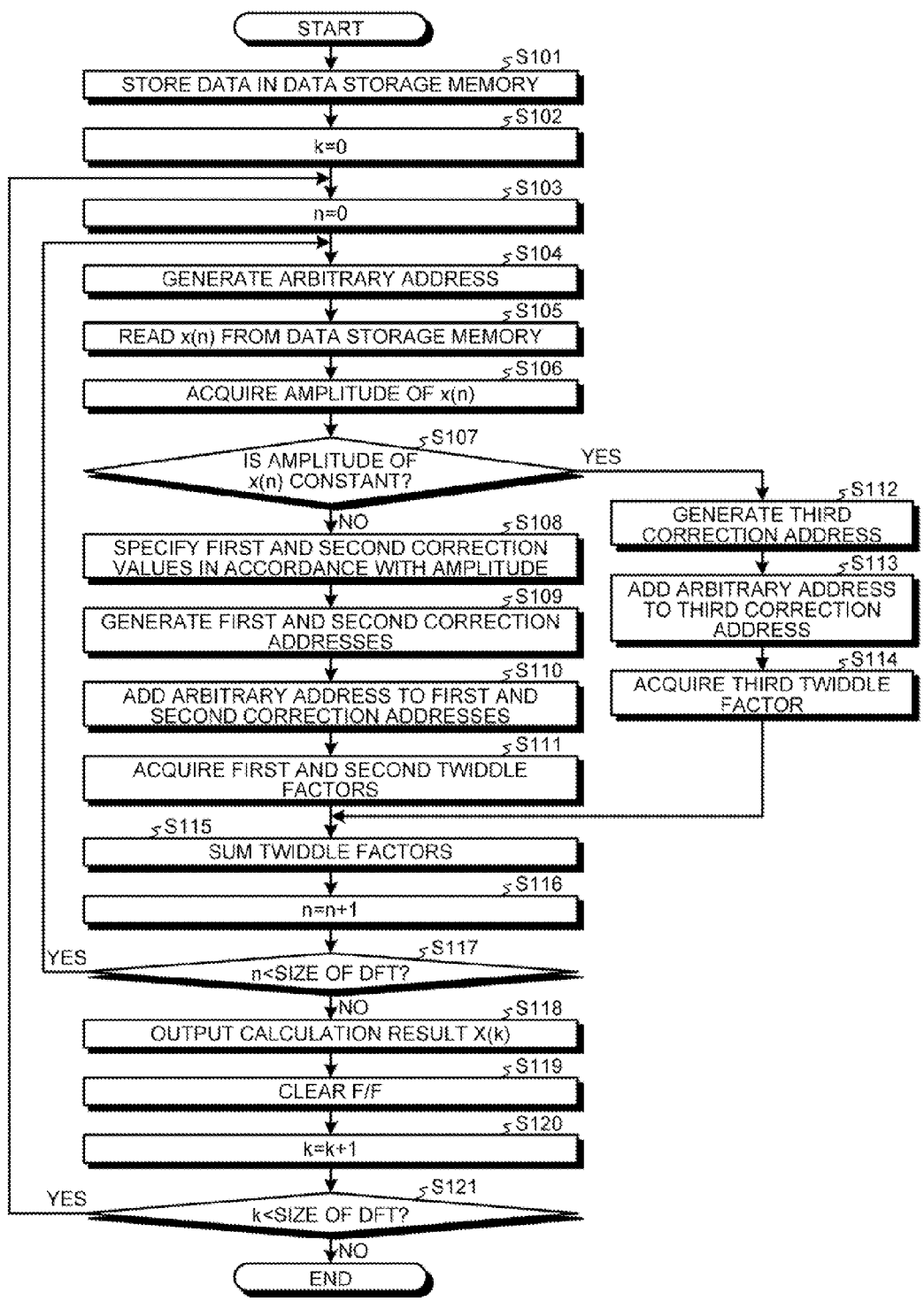

| INPUT AMPLITUDE | β (DEGREE) | ADDRESS OFFSET |
|---|---|---|
| 0 | 90.00 | ±300 |
| 1 | 89.78 | ±299 |
| ⋮ | ⋮ | ⋮ |
| 64 | 75.52 | ±255 |
| ⋮ | ⋮ | ⋮ |
| 128 | 60.00 | ±200 |
| ⋮ | ⋮ | ⋮ |
| 255 | 5.07 | ±17 |
| 256 | 0.00 | ±0 |

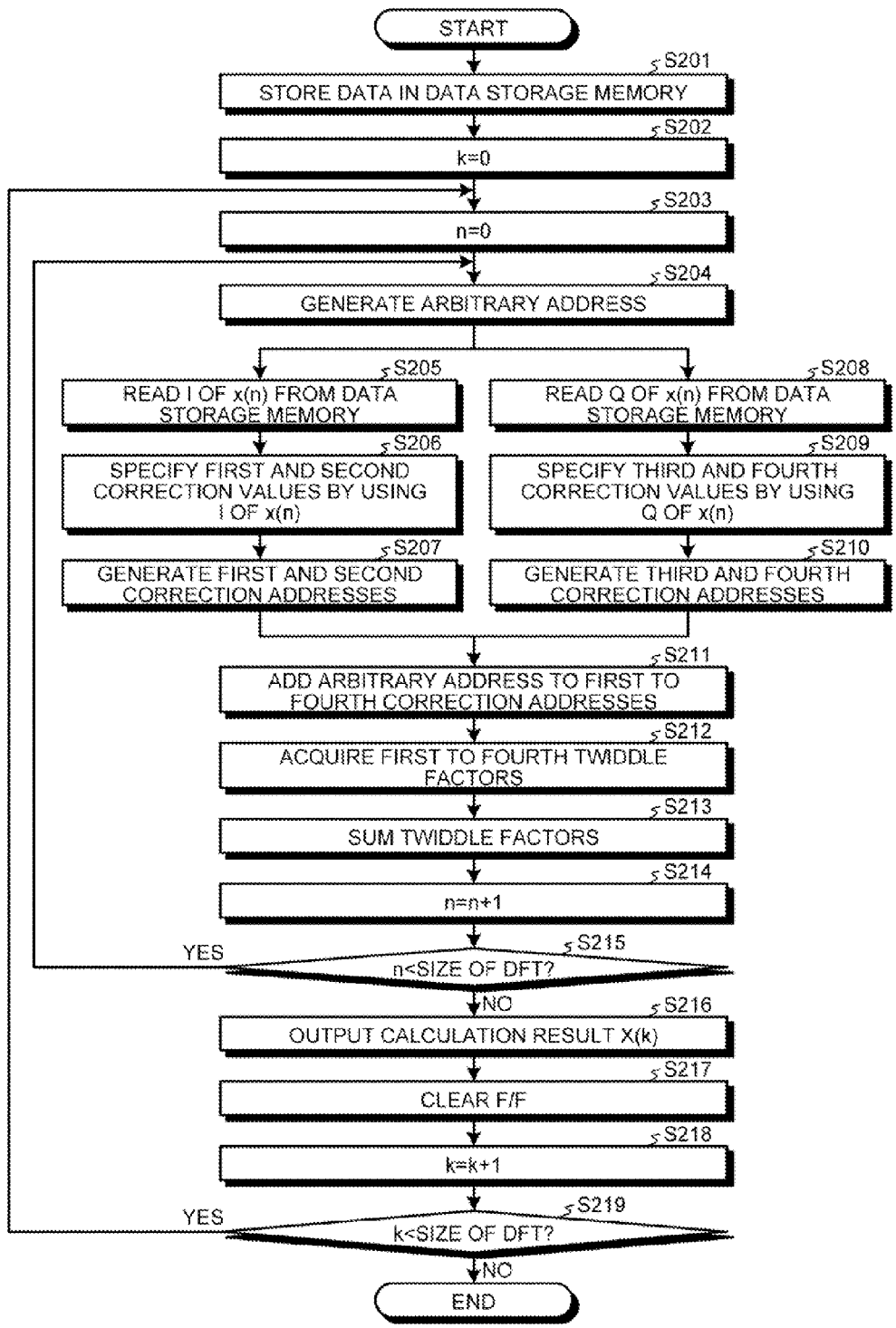

DISCRETE FOURIER CALCULATION DEVICE, RADIO COMMUNICATION DEVICE, AND DISCRETE FOURIER CALCULATION METHOD

CROSS-REFERENCE TO RELATED APPLICATION

This application is based upon and claims the benefit of priority of the prior Japanese Patent Application No. 2011-174418, filed on Aug. 9, 2011, the entire contents of which are incorporated herein by reference.

FIELD

The embodiments discussed herein are directed to a discrete Fourier calculation device, a radio communication device, and a discrete Fourier calculation method.

BACKGROUND

In recent years, LTE (Long Term Evolution) that is one of high-speed data communication specifications is widely spread in 3GPP (Third Generation Partnership Project). A radio communication device such as a mobile device that employs LTE performs a discrete Fourier transform (DFT) process when transmitting data. More specifically, when performing the DFT process, the radio communication device multiplies a twiddle factor by a time-domain signal that is an input signal and sums the multiplication results to converts the time-domain signal into a frequency-domain signal.

However, in the radio communication device that employs LTE, the more the size of DFT in the DFT process increases, the more a calculation amount accompanied with the DFT process increases. In other words, a multiplication to be executed when performing the DFT process is a complex multiplication, and one complex multiplication includes four real number multiplications. For this reason, the more the size of DFT in the DFT process increases, the more the number of complex multiplications increases. Furthermore, the number of real number multiplications increases to the quadruple of the number of complex multiplications.

Therefore, a method in which a complex multiplication is omitted has been proposed in order to reduce a calculation amount accompanied with the DFT process. In other words, in the method, twiddle factors placed on the circumference of a unit circle on a complex plane are previously stored in a twiddle factor table in association with the phases of the twiddle factors. Moreover, in the method, the phase of an arbitrary twiddle factor stored in the twiddle factor table is added to the phase of an input signal, and a twiddle factor corresponding to the added phase is acquired from the twiddle factor table to sum the acquired twiddle factor. As a result, because a calculation result of the DFT process is obtained only by summing twiddle factors, a complex division can be omitted and thus a calculation amount accompanied with the DFT process can be reduced.

Patent Document 1: Japanese Laid-open Patent Publication No. 2006-060433

The conventional method has a problem in that the scale of a radio communication device increases when the amplitude of an input signal is not constant.

More specifically, when a signal of which the amplitude is 1 (constant value) is an input signal as with a signal modulated by QPSK (Quadrature Phase Shift Keying), for example, it is only sufficient that the radio communication device has one twiddle factor table that stores therein a twiddle factor of which the amplitude is "1". However, when a signal that has three kinds of amplitudes is an input signal as with a signal modulated by 16QAM (Quadrature Amplitude Modulation), for example, the radio communication device has three twiddle factor tables that store therein twiddle factors according to the three amplitudes. As described above, because the radio communication device has a plurality of twiddle factor tables that respectively store therein twiddle factors according to amplitudes when the amplitude of an input signal is not constant, its circuit scale increases.

SUMMARY

According to an aspect of an embodiment of the invention, a discrete Fourier calculation device includes a twiddle factor table storage unit that stores therein a twiddle factor table that associates twiddle factors placed on a circumference of a unit circle on a complex plane with phases of the corresponding twiddle factors; a correction value specifying unit that specifies first and second correction values for correcting a phase of an input signal in accordance with an amplitude of the input signal; a generating unit that corrects the phase of the input signal by using the specified first and second correction values to generate first and second phases; an addition unit that adds an arbitrary phase, which is a phase corresponding to an arbitrary twiddle factor stored in the twiddle factor table, to each of the generated first and second phases; and a rotation calculation unit that acquires, from the twiddle factor table, first and second twiddle factors corresponding to the first and second phases to each of which the arbitrary phase is added by the addition unit and sums the acquired first and second twiddle factors to acquire a rotation calculation result on the input signal.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF THE DRAWINGS

FIG. 6 is a diagram illustrating a 64QAM modulation;

FIG. 8 is a diagram illustrating an example of a twiddle factor table;

FIG. 9 is a diagram illustrating an example of a correction phase table;

FIG. 10 is a diagram illustrating an example of the correction phase table;

FIG. 11A is a diagram illustrating another example of the correction phase table;

FIG. 11B is a diagram illustrating still another example of the correction phase table;

FIG. 12 is a flowchart illustrating the routine of a discrete Fourier calculation process that is performed by the DFT unit according to the first embodiment;

FIG. 17 is a flowchart illustrating the routine of a discrete Fourier calculation process that is performed by the DFT unit according to the second embodiment.

DESCRIPTION OF EMBODIMENTS

Preferred embodiments of the present invention will be explained with reference to accompanying drawings. Moreover, the following embodiments are explained about the case where a discrete Fourier calculation device according to embodiments of the present disclosure is applied to a radio communication device that employs LTE. The present invention is not limited to the embodiments explained below.

[a] First Embodiment

Figure 1:
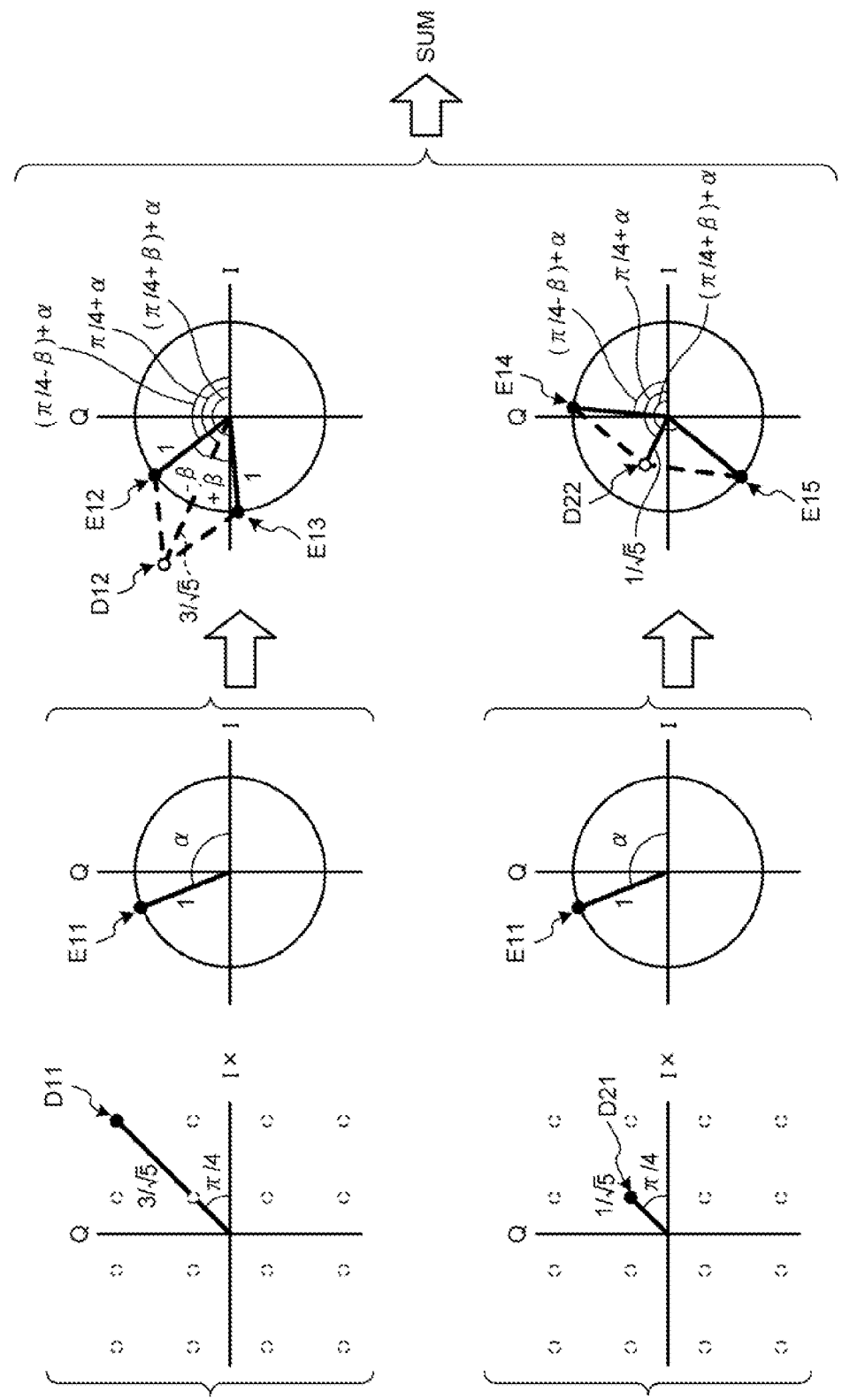
FIG. 1 is a diagram explaining a discrete Fourier calculation method that is performed by a radio communication device according to a first embodiment.

First, a discrete Fourier calculation method that is performed by a radio communication device according to the first embodiment will be explained with reference to FIG. 1. FIG. 1 is a diagram explaining a discrete Fourier calculation method that is performed by the radio communication device according to the first embodiment. In FIG. 1, it is assumed that an input signal is a signal modulated by 16QAM (Quadrature Amplitude Modulation) and includes three kinds of amplitudes. In this case, data D11 of the input signal is data of which the amplitude is $3/\sqrt{5}$ and the phase is $\pi/4$, and data D21 of the input signal is data of which the amplitude is $1/\sqrt{5}$ and the phase is $\pi/4$.

The radio communication device according to the present embodiment has a twiddle factor table that stores therein twiddle factors placed on the circumference of a unit circle on a complex plane in association with the phases of the twiddle factors.

First, the radio communication device specifies first and second correction values for correcting the phase of an input signal in accordance with amplitudes of the input signal. In the example of FIG. 1, the radio communication device specifies angles $\beta$ and $-\beta$, which are formed by the vector of the data D11 of the input signal and two unit vectors of which the size after composition is the amplitude of the data D11, as the first and second correction values. Moreover, the radio communication device specifies angles $\beta$ and $-\beta$, which are formed by the vector of the data D21 of the input signal and two unit vectors of which the size after composition is the amplitude of the data D21, as the first and second correction values.

Then, the radio communication device corrects the phase of the input signal to respectively generate first and second phases by using the specified first and second correction values. In the example of FIG. 1, the radio communication device corrects the phase $\pi/4$ of the data D11 of the input signal to respectively generate the first phase ($\pi/4-\beta$) and the second phase ($\pi/4+\beta$) by using the first correction value "$\beta$" and the second correction value "$-\beta$". Moreover, the radio communication device corrects the phase $\pi/4$ of the data D21 of the input signal to respectively generate the first phase ($\pi/4-\beta$) and the second phase ($\pi/4+\beta$) by using the first correction value "$\beta$" and the second correction value "$-\beta$".

Then, the radio communication device adds an arbitrary phase, which is a phase corresponding to an arbitrary twiddle factor stored in the twiddle factor table saved therein, to each of the generated first and second phases. In the example of FIG. 1, the radio communication device adds a phase $\alpha$ corresponding to an arbitrary twiddle factor E11 stored in the twiddle factor table to the first phase ($\pi/4-\beta$). Moreover, the radio communication device adds the phase $\alpha$ to the second phase ($\pi/4+\beta$).

Then, the radio communication device acquires, from the twiddle factor table, first and second twiddle factors corresponding to the first and second phases to each of which the arbitrary phase is added. In the example of FIG. 1, the radio communication device acquires, from the twiddle factor table, the first twiddle factors E12 and E14 corresponding to the first phase $\{(\pi/4-\beta)+\alpha\}$ obtained by adding the phase $\alpha$. Moreover, the radio communication device acquires, from the twiddle factor table, the second twiddle factors E13 and E15 corresponding to the second phase $\{(\pi/4+\beta)+\alpha\}$ obtained by adding the phase $\alpha$.

Then, the radio communication device sums the acquired first and second twiddle factors to acquire rotation calculation results for the input signal. In the example of FIG. 1, the radio communication device sums the first twiddle factor E12 and the second twiddle factor E13 to acquire a rotation calculation result D12 for the data D11 of the input signal. Moreover, the radio communication device sums the first twiddle factor E14 and the second twiddle factor E15 to acquires a rotation calculation result D22 for the data D21 of the input signal.

As described above, the radio communication device according to the present embodiment adds an arbitrary phase to first and second phases obtained by correcting the phases of an input signal in accordance with the amplitudes of the input signal. Then, the radio communication device acquires, from one twiddle factor table, two twiddle factors corresponding to the first and second phases to each of which the arbitrary phase is added and sums the acquired two twiddle factors to acquire a calculation result for the DFT process. For this reason, in the present embodiment, because a Fourier transform process can be performed by saving only one twiddle factor table even when the amplitude of the input signal is not constant, the increase of a circuit scale can be suppressed.

Figure 2:
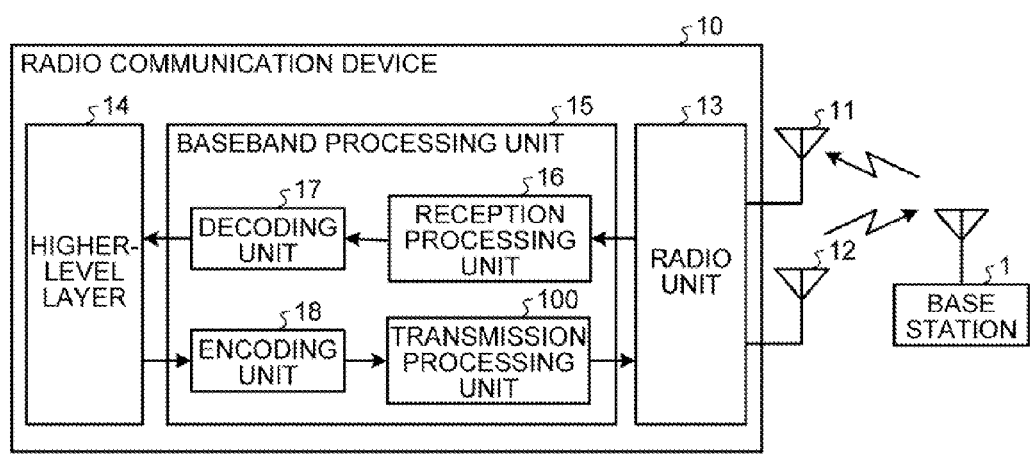
FIG. 2 is a block diagram illustrating a configuration example of the radio communication device according to the first embodiment.

Next, the configuration of a radio communication device according to the first embodiment will be explained with reference to FIG. 2. FIG. 2 is a block diagram illustrating a configuration example of a radio communication device 10 according to the first embodiment. The radio communication device 10 illustrated in FIG. 2 is, for example, a mobile device such as a portable telephone that employs LTE, and performs radio communication with a base station 1. As illustrated in FIG. 2, the radio communication device 10 includes a receiving antenna 11, a transmitting antenna 12, a radio unit 13, a higher-level layer 14, and a baseband processing unit 15.

The receiving antenna 11 is an antenna that receives a signal from an outside. For example, the receiving antenna 11 receives a signal transmitted from the base station 1. The transmitting antenna 12 is an antenna that transmits a signal to the outside. For example, the transmitting antenna 12 transmits a signal to the base station 1. Moreover, the radio communication device 10 may include a transmitting and receiving antenna that shares a receiving antenna and a transmitting antenna.

The radio unit 13 transmits and receives a radio signal via the receiving antenna 11 and the transmitting antenna 12. For example, the radio unit 13 performs a radio process such as an A/D (analog/digital) conversion on a signal received from the receiving antenna 11. Moreover, for example, the radio unit 13 performs a radio process such as a D/A (digital/analog) conversion on a signal input from a transmission processing unit 100 to be described below, and transmits the radio-processed signal to the base station 1 via the transmitting antenna 12.

When inputting reception data that is decoded from a decoding unit 17 to be described below, the higher-level layer 14 performs various types of processes on the basis of the reception data. For example, the higher-level layer 14 stores the reception data in a predetermined storage area when reception data is mail data.

When transmitting data to the outside such as the base station 1, the higher-level layer 14 generates transmission data and outputs the generated transmission data to an encoding unit 18. It is assumed that the radio communication device 10 transmits data by using a physical channel such as PUCCH (Physical Uplink Control Channel) and PUSCH (Physical Uplink Shared Channel). In this case, the higher-level layer 14 generates transmission data on the basis of the operation of a user, for example. Moreover, it is assumed that the radio communication device 10 transmits a reference signal such as SRS (Sounding Reference Signal) and DRS (Demodulation Reference Signal). In this case, the higher-level layer 14 outputs, for example, a Zadoff-Chu series number to the transmission processing unit 100.

The baseband processing unit 15 performs a baseband process on transmission data and reception data. As illustrated in FIG. 2, the baseband processing unit 15 includes a reception processing unit 16, the decoding unit 17, the encoding unit 18, and the transmission processing unit 100.

The reception processing unit 16 performs various types of reception processes on the reception data input from the radio unit 13. For example, the reception processing unit 16 performs a CP (cyclic prefix) deletion process, a demodulation process, and the like on the reception data input from the radio unit 13. The decoding unit 17 decodes the reception data input from the reception processing unit 16.

The encoding unit 18 gives an error correction code to the transmission data input from the higher-level layer 14. The transmission processing unit 100 performs various types of transmission processes on the transmission data to which the error correction code is given by the encoding unit 18. The processes that are performed by the transmission processing unit 100 are specifically explained with reference to FIG. 3.

Figure 3:
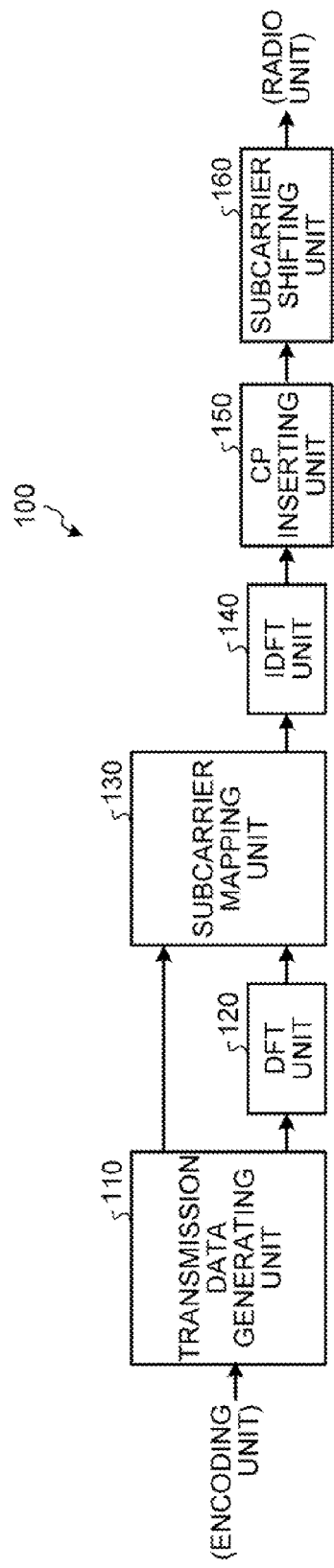
FIG. 3 is a block diagram illustrating a configuration example of a transmission processing unit according to the first embodiment.

Next, the configuration of the transmission processing unit 100 according to the first embodiment will be explained with reference to FIG. 3. FIG. 3 is a block diagram illustrating a configuration example of the transmission processing unit 100 according to the first embodiment. As illustrated in FIG. 3, the transmission processing unit 100 according to the first embodiment includes a transmission data generating unit 110, a DFT unit 120, a subcarrier mapping unit 130, an IDFT unit 140, a CP (cyclic prefix) inserting unit 150, and a subcarrier shifting unit 160.

When inputting data from the encoding unit 18, the transmission data generating unit 110 modulates the data to generate transmission data. More specifically, the transmission data generating unit 110 performs a modulation process by using a modulation method such as QPSK (Quadrature Phase Shift Keying), 16QAM, and 64QAM.

Figure 4:
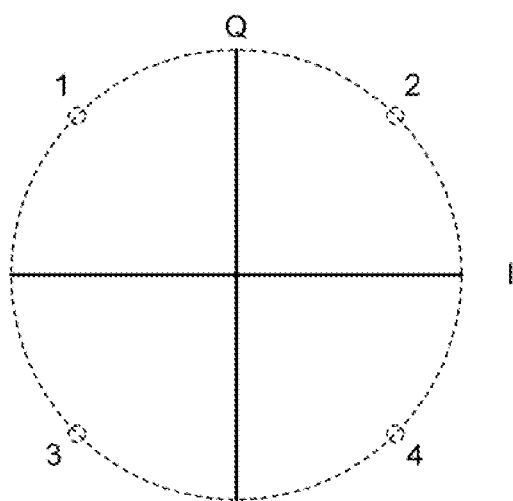
FIG. 4 is a diagram illustrating a QPSK modulation.
Figure 5:
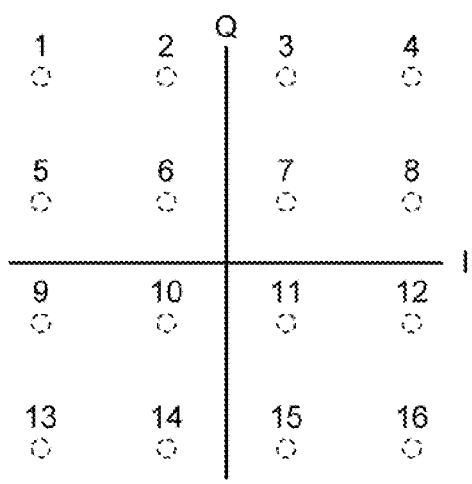
FIG. 5 is a diagram illustrating a 16QAM modulation.

For example, when data transmitted through PUSCH is modulated by QPSK, the transmission data generating unit 110 maps a data bit stream to four signal points on the circumference of a radius "1" on an IQ plane as illustrated in FIG. 4. Moreover, for example, when data transmitted through PUSCH is modulated by 16QAM, the transmission data generating unit 110 maps a data bit stream to 16 signal points of which the amplitudes and phases are different on the IQ plane as illustrated in FIG. 5.

For example, when data transmitted through PUSCH is modulated by 64QAM, the transmission data generating unit 110 maps a data bit stream to 64 signal points of which the amplitudes and phases are different on the IQ plane as illustrated in FIG. 6. In other words, the amplitude of data modulated by QPSK is "1" and thus is constant. On the other hand, the amplitude of data modulated by 16QAM and 64QAM is not constant. Moreover, FIG. 4 is a diagram illustrating a QPSK modulation. FIG. 5 is a diagram illustrating a 16QAM modulation. FIG. 6 is a diagram illustrating a 64QAM modulation.

The transmission data generating unit 110 outputs the generated transmission data to one of the DFT unit 120 and the subcarrier mapping unit 130. For example, when transmission data is data transmitted through PUCCH, SRS, and DRS, the transmission data generating unit 110 outputs the transmission data to the subcarrier mapping unit 130. On the other hand, when transmission data is data transmitted through PRACH and PUSCH, for example, the transmission data generating unit 110 outputs the transmission data to the DFT unit 120.

The DFT unit 120 performs a discrete Fourier transform process on the transmission data input from the transmission data generating unit 110 to convert time-domain data into frequency-domain data, and outputs the converted data to the subcarrier mapping unit 130. The discrete Fourier transform process performed by the DFT unit 120 is a calculation expressed by the following Equation (1).

$$X(k) = \sum_{n=0}^{N_{DFT}-1} x(n) \exp\left(-j\frac{2\pi nk}{N_{DFT}}\right) \quad (1)$$

In Equation (1), X(k) indicates frequency-domain data after Fourier transform. Moreover, x(n) indicates time-domain data before Fourier transform. Moreover, $N_{DFT}$ indicates the size of DFT. Moreover, "k" indicates a frequency-domain sample number of recognizing a sample point of a frequency-domain signal. Moreover, "n" indicates a time-domain sample number of recognizing a sample point of a time-domain signal. Moreover, "k" and "n" have values from "0" to "$N_{DFT}-1$".

Figure 7:
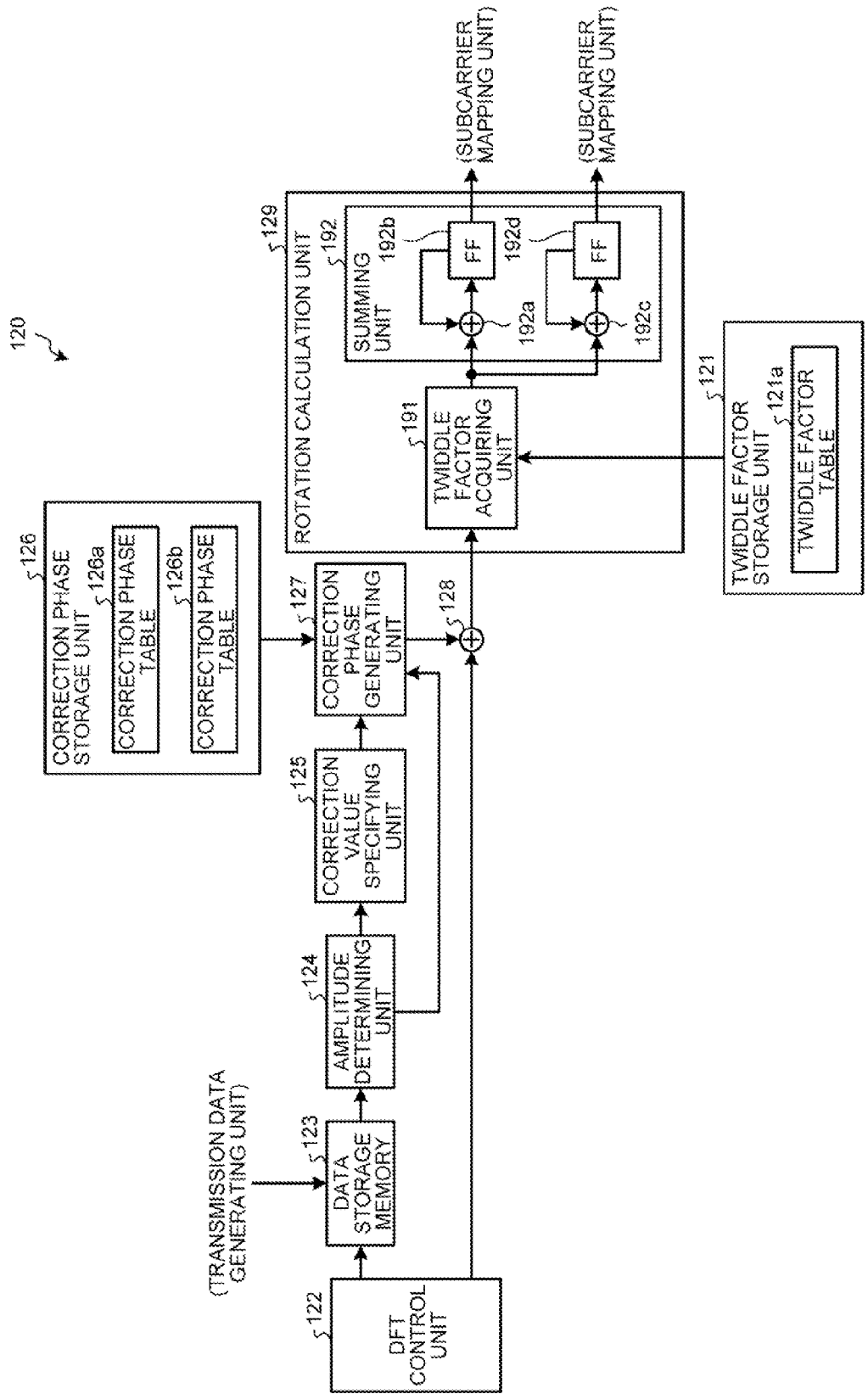
FIG. 7 is a diagram illustrating the detailed configuration of a DFT unit according to the first embodiment.

The specific contents of a process that is performed by the DFT unit 120 will be below explained with reference to FIG. 7.

The subcarrier mapping unit 130 maps, to subcarriers, the transmission data input from the transmission data generating unit 110 and the frequency-domain data input from the DFT unit 120. The IDFT unit 140 converts the frequency-domain data mapped to subcarriers by the subcarrier mapping unit 130 into time-domain data, and outputs the converted data to the CP inserting unit 150.

The CP inserting unit 150 sets as CP a trailing predetermined time of the time-domain data input from the IDFT unit 140 and inserts the CP to the head of the time-domain data. The subcarrier shifting unit 160 multiplies a twiddle factor by the data to which the CP is inserted by the CP inserting unit 150 to perform a frequency shift by "½" of the bandwidth of each subcarrier. The subcarrier shifting unit 160 then outputs the time-domain data obtained by performing the subcarrier shift process to the radio unit 13.

Next, the detailed configuration of the DFT unit 120 illustrated in FIG. 3 will be explained. FIG. 7 is a diagram illustrating the detailed configuration of the DFT unit 120 according to the first embodiment. As illustrated in FIG. 7, the DFT unit 120 includes a twiddle factor storage unit 121, a DFT control unit 122, a data storage memory 123, an amplitude determining unit 124, a correction value specifying unit 125, a correction phase storage unit 126, a correction phase generating unit 127, an addition unit 128, and a rotation calculation unit 129.

The twiddle factor storage unit 121 stores therein a twiddle factor table 121a that associates twiddle factors placed on the circumference of a unit circle on a complex plane with the phases of the twiddle factors. The twiddle factor table 121a has N twiddle factors. Herein, "N" is the size of DFT. In the present embodiment, the size of DFT is regarded as "1200". Therefore, the twiddle factor table 121a of the present embodiment has 1200 twiddle factors that are obtained by dividing $2\pi$ by 1200. An example of the twiddle factor table 121a is illustrated in FIG. 8.

As illustrated in FIG. 8, the twiddle factor table 121a has items such as for example an address, an I value, and a Q value, which are associated with one another. Among them, an address item indicates a phase of each twiddle factor that is placed on the circumference of the unit circle on the complex plane. Herein, because the number of twiddle factors is 1200, the phases (addresses) of the twiddle factors have values of 0 to 1999. An I value item indicates a value on an I axis of each twiddle factor that is placed on the circumference of the unit circle on the complex plane. A Q value item indicates a value on a Q axis of each twiddle factor that is placed on the circumference of the unit circle on the complex plane.

The DFT control unit 122 totally controls the processes of the DFT unit 120. More specifically, the DFT control unit 122 provides a write address to the data storage memory 123, and instructs the data storage memory 123 to store data from the transmission data generating unit 110 by using the provided write address.

The DFT control unit 122 generates an arbitrary phase (or, "arbitrary address") that indicates a phase with respect to an arbitrary twiddle factor stored in the twiddle factor table 121a. More specifically, the DFT control unit 122 performs a calculation expressed with the following Equation (2) to generate an arbitrary address. Then, the DFT control unit 122 outputs the generated arbitrary address to the addition unit 128.

$$(n*k) \bmod N \quad (2)$$

In Equation (2), "k" indicates a frequency-domain sample number of recognizing a sample point of a frequency-domain signal. Moreover, "n" indicates a time-domain sample number of recognizing a sample point of a time-domain signal. Moreover, "N" indicates the size of DFT and is "1200" in the present embodiment.

The data storage memory 123 receives an instruction from the DFT control unit 122. The data storage memory 123 stores time-domain data x(n) input from the transmission data generating unit 110 in association with a write address "n" provided from the DFT control unit 122 in accordance with the instruction from the DFT control unit 122.

The amplitude determining unit 124 determines whether the amplitude of the time-domain data input from the transmission data generating unit 110 is constant. More specifically, the amplitude determining unit 124 reads out the time-domain data x(n) from the data storage memory 123. The amplitude determining unit 124 acquires the amplitude of the read data x(n) and determines whether the amplitude of the data x(n) is constant. When the amplitude of the data x(n) is not constant, the amplitude determining unit 124 informs the correction value specifying unit 125 of the amplitude of the data x(n) in order to indicate that the data x(n) is data modulated by 16QAM or 64QAM. On the other hand, when the amplitude of the data x(n) is constant, the amplitude determining unit 124 informs the correction phase generating unit 127 of the phase of the data x(n) in order to indicate that the data x(n) is data modulated by QPSK.

The correction value specifying unit 125 specifies the first and second correction values of correcting the phase of the time-domain signal in accordance with the amplitudes of the data of the time-domain signal input from the transmission data generating unit 110. More specifically, the correction value specifying unit 125 receives the amplitude of the data x(n) of the time-domain signal from the amplitude determining unit 124. The correction value specifying unit 125 respectively specifies, as the first and second correction values, angles $\beta$ and $-\beta$ that are formed by the vector of the data x(n) of the time-domain signal and two unit vectors of which the size after composition is the amplitude of the data x(n) of the time-domain signal. In other words, the correction value specifying unit 125 specifies the arccosine value of the value obtained by dividing the amplitude of the data x(n) of the time-domain signal by two as the first correction value $\beta$, and specifies the value obtained by reversing the sign of the arccosine value as the second correction value $-\beta$. The correction value specifying unit 125 then outputs the specified first and second correction values to the correction phase generating unit 127.

The correction phase storage unit 126 stores therein a correction phase table 126a and a correction phase table 126b. The correction phase table 126a is a table for converting the phase of the data x(n) into the third phase corresponding to the address of the twiddle factor table 121a when the amplitude of the data x(n) of the time-domain signal is constant. An example of the correction phase table 126a is illustrated in FIG. 9.

As illustrated in FIG. 9, the correction phase table 126a has items such as for example a signal point, an amplitude, a phase, and an address offset in association with one another. Among them, a signal point item indicates identification numbers of four signal points to which the data x(n) modulated by QPSK is mapped. An amplitude item indicates the amplitudes of the data x(n) mapped to the signal points. A phase item indicates the phases of the data x(n) mapped to the signal points. An address offset item indicates values (hereinafter, "third correction addresses") that are obtained by converting the phases of the data x(n) mapped to the signal points into the third phases corresponding to the addresses of the twiddle factor table 121a.

The correction phase table 126b is a table for converting the first and second correction values into the first and second phases corresponding to the addresses of the twiddle factor table 121a when the amplitude of the data x(n) of the time-domain signal is not constant. An example of the correction phase table 126b is illustrated in FIG. 10.

As illustrated in FIG. 10, the correction phase table 126b has items such as for example a signal point, an amplitude, a phase, an addition phase, and an address offset in association with one another. Among them, a signal point item indicates the identification numbers of 16 signal points to which the data x(n) modulated by 16QAM is mapped. An amplitude item indicates the amplitudes of the data x(n) mapped to the signal points. A phase item indicates the phases of the data x(n) mapped to the signal points. An addition phase item indicates the first correction values and the second correction values for correcting the phases of the data x(n) mapped to the signal points. In this case, a positive value is the first correction value and a negative value is the second correction value. An address offset item indicates the first phases and the second phases obtained by correcting the phases of the data x(n) mapped to the signal points by using the first correction values and the second correction values. Moreover, the address offset according to the present embodiment indicates values (hereinafter, "the first correction address" and "the second correction address) that are obtained by converting the first phase and the second phase into the addresses of the twiddle factor table 121a.

Another example of the correction phase table 126b is illustrated in FIGS. 11A and 11B. As illustrated in FIGS. 11A and 11B, the correction phase table 126b has items such as for example a signal point, an amplitude, a phase, an addition phase, and an address offset in association with one another. Among them, a signal point item indicates the identification numbers of 64 signal points to which the data x(n) modulated by 64QAM is mapped. An amplitude item indicates the amplitudes of the data x(n) mapped to the signal points. A phase item indicates the phases of the data x(n) mapped to the signal points. An addition phase item indicates the first correction values and the second correction values for correcting the phases of the data x(n) mapped to the signal points. In this case, a positive value is the first correction value and a negative value is the second correction value. An address offset item indicates the first phases and the second phases obtained by correcting the phases of the data x(n) mapped to the signal points by using the first correction values and the second correction values. Moreover, the address offset item according to the present embodiment indicates values that are obtained by converting the first phase and the second phase into the addresses of the twiddle factor table 121a.

The correction phase generating unit 127 corrects the phase of the time-domain signal x(n) by using the first and second correction values specified by the correction value specifying unit 125 to generate the first and second phases. More specifically, the correction phase generating unit 127 receives the first and second correction values from the correction value specifying unit 125 when the amplitude of the data x(n) of the time-domain signal is not constant. Then, the correction phase generating unit 127 acquires the first and second correction addresses corresponding to the first and second correction values with reference to the correction phase table 126b of the correction phase storage unit 126 to generate the first and second correction addresses. Then, the correction phase generating unit 127 outputs the generated first and second correction addresses to the addition unit 128.

Furthermore, when the phase of the time-domain data x(n) is constant, the correction phase generating unit 127 generates the third phase by using the phase of the data x(n). More specifically, the correction phase generating unit 127 receives the phase of the data x(n) from the amplitude determining unit 124 when the phase of the time-domain data x(n) is constant. Then, the correction phase generating unit 127 acquires the third correction address corresponding to the third phase with reference to the correction phase table 126a of the correction phase storage unit 126 to generate the third correction address. The correction phase generating unit 127 then outputs the generated third correction address to the addition unit 128.

The addition unit 128 receives the first and second correction addresses from the correction phase generating unit 127.

The addition unit 128 receives an arbitrary address from the DFT control unit 122. Then, the addition unit 128 adds the arbitrary address to each of the first and second correction addresses. Then, the addition unit 128 outputs the first and second correction addresses after addition of the arbitrary address to the rotation calculation unit 129.

Furthermore, the addition unit 128 receives the third correction address from the correction phase generating unit 127. Then, the addition unit 128 adds the arbitrary address to the third correction address. The addition unit 128 outputs the third correction address after addition of the arbitrary address to the rotation calculation unit 129.

The rotation calculation unit 129 includes a twiddle factor acquiring unit 191 and a summing unit 192. The twiddle factor acquiring unit 191 receives the first and second correction addresses after addition of the arbitrary address from the addition unit 128. Then, the twiddle factor acquiring unit 191 acquires the first and second twiddle factors corresponding to the first and second correction addresses after addition of the arbitrary address from the twiddle factor table 121a. Then, the twiddle factor acquiring unit 191 outputs I values of the first and second twiddle factors to an adder 192a of the summing unit 192 to be described below and outputs Q values of the first and second twiddle factors to an adder 192c of the summing unit 192 to be described below.

Furthermore, the twiddle factor acquiring unit 191 receives the third correction address after addition of the arbitrary address from the addition unit 128. Then, the twiddle factor acquiring unit 191 acquires the third twiddle factor corresponding to the third correction address after addition of the arbitrary address from the twiddle factor table 121a. Then, the twiddle factor acquiring unit 191 outputs the I value of the third twiddle factor to the adder 192a of the summing unit 192 and outputs the Q value of the third twiddle factor to the adder 192c of the summing unit 192.

The summing unit 192 sums the first and second twiddle factors or the third twiddle factor acquired by the twiddle factor acquiring unit 191 to acquire a rotation calculation result X(k) for the time-domain signal input from the transmission data generating unit 110. More specifically, the summing unit 192 includes the adder 192a, a flip-flop circuit 192b, the adder 192c, and a flip-flop circuit 192d.

The adder 192a receives the I values at a time "t" of the first and second twiddle factors or the third twiddle factor from the twiddle factor acquiring unit 191. The adder 192a receives the I values at a time "t−1" from the flip-flop circuit 192b. Herein, the I value at the time "t" means an I value at an arbitrary time and the I value at the time "t−1" means an I value at a time just prior to the time "t" in time series. Then, the adder 192a adds the I value at the time "t−1" to the I value at the time "t" and outputs the result to the flip-flop circuit 192b. The flip-flop circuit 192b saves the I value at the time "t−1" input from the adder 192a until the adder 192a receives the I value at the time "t". When the adder 192a receives the I value at the time "t", the flip-flop circuit 192b outputs the I value at the time "t−1" to the subcarrier mapping unit 130.

The adder 192c receives the Q values at the time "t" of the first and second twiddle factors or the third twiddle factor from the twiddle factor acquiring unit 191. The adder 192c receives the Q values at the time "t−1" from the flip-flop circuit 192d. Herein, the Q value at the time "t" means a Q value at an arbitrary time and the Q value at the time "t−1" means a Q value at a time just prior to the time "t" in time series. Then, the adder 192c adds the Q value at the time "t−1" to the I value at the time "t" and outputs the result to the flip-flop circuit 192d. The flip-flop circuit 192d saves the Q value at the time "t−1" input from the adder 192c until the adder 192a receives the Q value at the time "t". When the adder 192c receives the Q value at the time "t", the flip-flop circuit 192d outputs the Q value at the time "t−1" to the subcarrier mapping unit 130.

Next, the routine of a discrete Fourier calculation process that is performed by the DFT unit 120 of the present embodiment will be explained with reference to FIG. 12. FIG. 12 is a flowchart illustrating the routine of a discrete Fourier calculation process that is performed by the DFT unit 120 according to the first embodiment.

As illustrated in FIG. 12, the DFT control unit 122 provides a write address to the data storage memory 123, and the data storage memory 123 stores therein time-domain data x(n) input from the transmission data generating unit 110 in association with a write address "n" (Step S101). Next, the DFT control unit 122 initializes, to zero, a frequency-domain sample number "k" that indicates a sample point of a frequency-domain signal (Step S102). Next, the DFT control unit 122 initializes, to zero, a time-domain sample number "n" that indicates a sample point of a time-domain signal (Step S103).

Next, the DFT control unit 122 generates an arbitrary address that indicates a phase with respect to an arbitrary twiddle factor stored in the twiddle factor table 121a (Step S104). In other words, the DFT control unit 122 performs a calculation expressed with Equation (2) to generate an arbitrary address. Then, the DFT control unit 122 outputs the generated arbitrary address to the addition unit 128.

Next, the amplitude determining unit 124 reads out the time-domain data x(n) from the data storage memory 123 (Step S105). Then, the amplitude determining unit 124 acquires the amplitude of the read data x(n) (Step S106), and determines whether the amplitude of the data x(n) is constant (Step S107).

Then, when the amplitude of the data x(n) is not constant (Step S107: NO), the amplitude determining unit 124 informs the correction value specifying unit 125 of the amplitude of the data x(n) in order to indicate that the data x(n) is data modulated by 16QAM or 64QAM.

The correction value specifying unit 125 that receives the amplitude of the data x(n) specifies first and second correction values for correcting the phase of the time-domain signal in accordance with the amplitude of the data x(n) (Step S108). The correction value specifying unit 125 then outputs the specified first and second correction values to the correction phase generating unit 127. The correction phase generating unit 127 that receives the first and second correction values refers to the correction phase table 126b. Then, the correction phase generating unit 127 acquires first and second correction addresses corresponding to the first and second correction values from the correction phase table 126b to generate the first and second correction addresses (Step S109). Then, the correction phase generating unit 127 outputs the generated first and second correction addresses to the addition unit 128.

The addition unit 128 that receives the first and second correction addresses and the arbitrary address adds the arbitrary address to the first and second correction addresses (Step S110). Then, the addition unit 128 outputs the first and second correction addresses after addition of the arbitrary address to the rotation calculation unit 129.

Then, the twiddle factor acquiring unit 191 of the rotation calculation unit 129 acquires first and second twiddle factors corresponding to the first and second correction addresses after addition of the arbitrary address from the twiddle factor table 121a (Step S111). Then, the twiddle factor acquiring unit 191 outputs I values of the first and second twiddle factors to the adder 192a of the summing unit 192 and outputs Q values of the first and second twiddle factors to the adder 192c of the summing unit 192.

On the other hand, when the amplitude of the data x(n) is constant (Step S107: YES), the amplitude determining unit 124 outputs the phase of the data x(n) to the correction phase generating unit 127 in order to indicate that the data x(n) is data modulated by QPSK.

The correction phase generating unit 127 that receives the phase of the data x(n) acquires a third correction address corresponding to the third phase with reference to the correction phase table 126a to generate the third correction address (Step S112). The correction phase generating unit 127 then outputs the generated third correction address to the addition unit 128.

The addition unit 128 that receives the third correction address and the arbitrary address adds the arbitrary address to the third correction address (Step S113). Then, the addition unit 128 outputs the third correction address after addition of the arbitrary address to the rotation calculation unit 129.

Then, the twiddle factor acquiring unit 191 of the rotation calculation unit 129 acquires a third twiddle factor corresponding to the third correction address after addition of the arbitrary address from the twiddle factor table 121a (Step S114). Then, the twiddle factor acquiring unit 191 outputs an I value of the third twiddle factor to the adder 192a of the summing unit 192 and outputs a Q value of the third twiddle factor to the adder 192c of the summing unit 192.

Next, the summing unit 192 sums the first and second twiddle factors or the third twiddle factor acquired by the twiddle factor acquiring unit 191 (Step S115). As a result, a rotation calculation result X(k) for the time-domain signal input from the transmission data generating unit 110 is obtained.

After that, the DFT control unit 122 increments the time-domain sample number "n" (Step S116). The DFT control unit 122 repeatedly performs the routine of Steps S104 to S116 when "n" is smaller than the size of DFT (Step S117: YES).

On the other hand, the DFT control unit 122 moves the routine to Step S118 when "n" is not less than the size of DFT (Step S117: NO). Then, the summing unit 192 outputs the rotation calculation result X(k) to the subcarrier mapping unit 130 (Step S118), and clears the flip-flop circuits 192b and 192d (Step S119).

After that, the DFT control unit 122 increments the frequency-domain sample number "k" (Step S120). Then, the DFT control unit 122 repeatedly performs the routine of Steps S103 to S120 when "k" is smaller than the size of DFT (Step S121: YES). On the other hand, the DFT control unit 122 terminates the process when "k" is not less than the size of DFT (Step S121: NO).

As described above, the radio communication device 10 according to the first embodiment adds an arbitrary phase to first and second phases obtained by correcting the phase of the input signal in accordance with the amplitude of the input signal. Then, the radio communication device 10 acquires two twiddle factors corresponding to the phases after addition of the arbitrary phase from the one twiddle factor table 121a and sums the two twiddle factors to acquire the calculation result on the DFT process. For this reason, because the radio communication device 10 according to the first embodiment can perform a Fourier transform process by saving only the one twiddle factor table 121a even when the amplitude of the input signal is not constant, the increase of a circuit scale can be suppressed.

The radio communication device 10 according to the first embodiment generates a third phase by using the phase of the input signal and adds the arbitrary phase to the generated third phase when the amplitude of the input signal is constant. Then, the radio communication device 10 acquires one twiddle factor corresponding to the phase after addition of the arbitrary phase from the one twiddle factor table 121*a* and sums the one twiddle factor to acquire the calculation result on the DFT process. For this reason, because the radio communication device 10 according to the first embodiment can perform the Fourier transform process by saving only the one twiddle factor table 121*a* even when the amplitude of the input signal is constant, the increase of a circuit scale can be further suppressed.

[b] Second Embodiment

The second embodiment is different from the first embodiment in that an arbitrary phase is added to four phases obtained by correcting the phases of an I value and a Q value included in an input signal and four twiddle factors for the four phases after addition of the arbitrary phase are acquired from one twiddle factor table and are summed.

Figure 13:
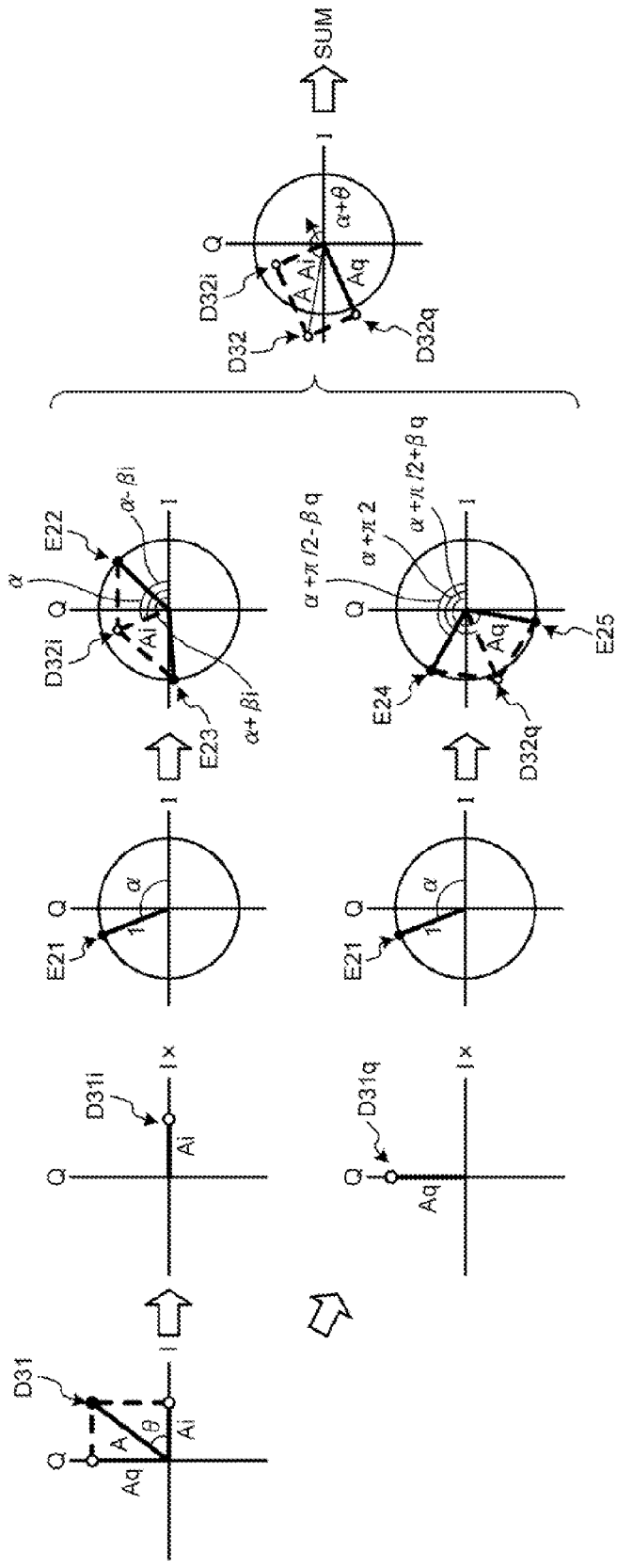
FIG. 13 is a diagram explaining a discrete Fourier calculation method that is performed by a radio communication device according to a second embodiment.

First, a discrete Fourier calculation method that is performed by a radio communication device according to the second embodiment will be explained with reference to FIG. 13. FIG. 13 is a diagram explaining a discrete Fourier calculation method that is performed by a radio communication device according to the second embodiment. In FIG. 13, data D31 of an input signal is regarded as data whose amplitude A and phase θ are unknown.

The radio communication device according to the present embodiment saves a twiddle factor table that associates twiddle factors placed on the circumference of a unit circle on a complex plane with phases of the respective twiddle factors.

First, the radio communication device specifies first and second correction values for correcting the phase of an I value in an input signal that includes an I value that is a value on a real number axis and a Q value that is a value on an imaginary number axis of the complex plane. In the example of FIG. 13, the radio communication device specifies angles βi and −βi, which are formed by the vector of an I value D31*i* and two unit vectors of which the size after composition is an amplitude Ai of the I value D31*i* of the data D31 of the input signal, as the first and second correction values, respectively.

Then, the radio communication device corrects the phase of the I value by using the specified first and second correction values to generate first and second phases. In the example of FIG. 13, the radio communication device corrects the phase 0 of the I value D31*i* by using the first correction value βi and the second correction value −βi to generate the first phase (0−βi) and the second phase (0+βi).

Moreover, the radio communication device specifies third and fourth correction values for correcting the phase of a Q value in the input signal. In the example of FIG. 13, the radio communication device specifies angles βq and −βq, which are formed by the vector of a Q value D31*q* and two unit vectors of which the size after composition is an amplitude Aq of the Q value D31*q* of the data D31 of the input signal, as the third and fourth correction values, respectively.

Then, the radio communication device corrects the phase of the Q value by using the specified third and fourth correction values to generate third and fourth phases. In the example of FIG. 13, the radio communication device corrects the phase π/2 of the Q value D31*q* by using the third correction value βq and the fourth correction value −βq to generate the third phase (π/2−βq) and the fourth phase (π/2+βq).

Then, the radio communication device adds, to each of the generated first to fourth phases, an arbitrary phase that is a phase corresponding to an arbitrary twiddle factor stored in the twiddle factor table saved therein. In the example of FIG. 13, the radio communication device adds a phase α corresponding to an arbitrary twiddle factor E21 stored in the twiddle factor table to the first phase (0−βi). The radio communication device further adds the phase α to the second phase (0+βi). Moreover, the radio communication device adds the phase α to the third phase (π/2−βq). The radio communication device further adds the phase α to the fourth phase (π/2+βq).

Then, the radio communication device acquires first to fourth twiddle factors corresponding to the first to fourth phases obtained by adding the arbitrary phase from the twiddle factor table. In the example of FIG. 13, the radio communication device acquires a first twiddle factor E22 corresponding to the first phase (α−βi) obtained by adding the phase α from the twiddle factor table. The radio communication device further acquires a second twiddle factor E23 corresponding to the second phase (α+βi) obtained by adding the phase α from the twiddle factor table. Moreover, the radio communication device acquires a third twiddle factor E24 corresponding to the third phase (α+π/2−βq) obtained by adding the phase α from the twiddle factor table. The radio communication device further acquires a fourth twiddle factor E25 corresponding to the fourth phase (α+π/2+βq) obtained by adding the phase α from the twiddle factor table.

Then, the radio communication device sums the acquired first to fourth twiddle factors to acquire a rotation calculation result on the input signal. In the example of FIG. 13, the radio communication device sums the first twiddle factor E22 and the second twiddle factor E23 to acquire a rotation calculation result D32*i* on the I value D31*i*. The radio communication device further sums the third twiddle factor E24 and the fourth twiddle factor E25 to acquire a rotation calculation result D32*q* on the Q value D31*q*. Then, the rotation calculation result D32*i* on the I value D31*i* and the rotation calculation result D32*q* on the Q value D31*q* are summed to acquire a rotation calculation result D32 on the data D31 of the input signal.

As described above, the radio communication device according to the second embodiment adds an arbitrary phase to four phases obtained by correcting the phases of an I value and a Q value included in an input signal. Then, the radio communication device acquires four twiddle factors for four phases after addition of the arbitrary phase from one twiddle factor table and sums the four twiddle factors to acquire the calculation result on the DFT process. For this reason, according to the present embodiment, because the Fourier transform process can be performed by saving only one twiddle factor table even when the amplitude and phase of the input signal is unknown, the increase of a circuit scale can be suppressed.

Figure 14:
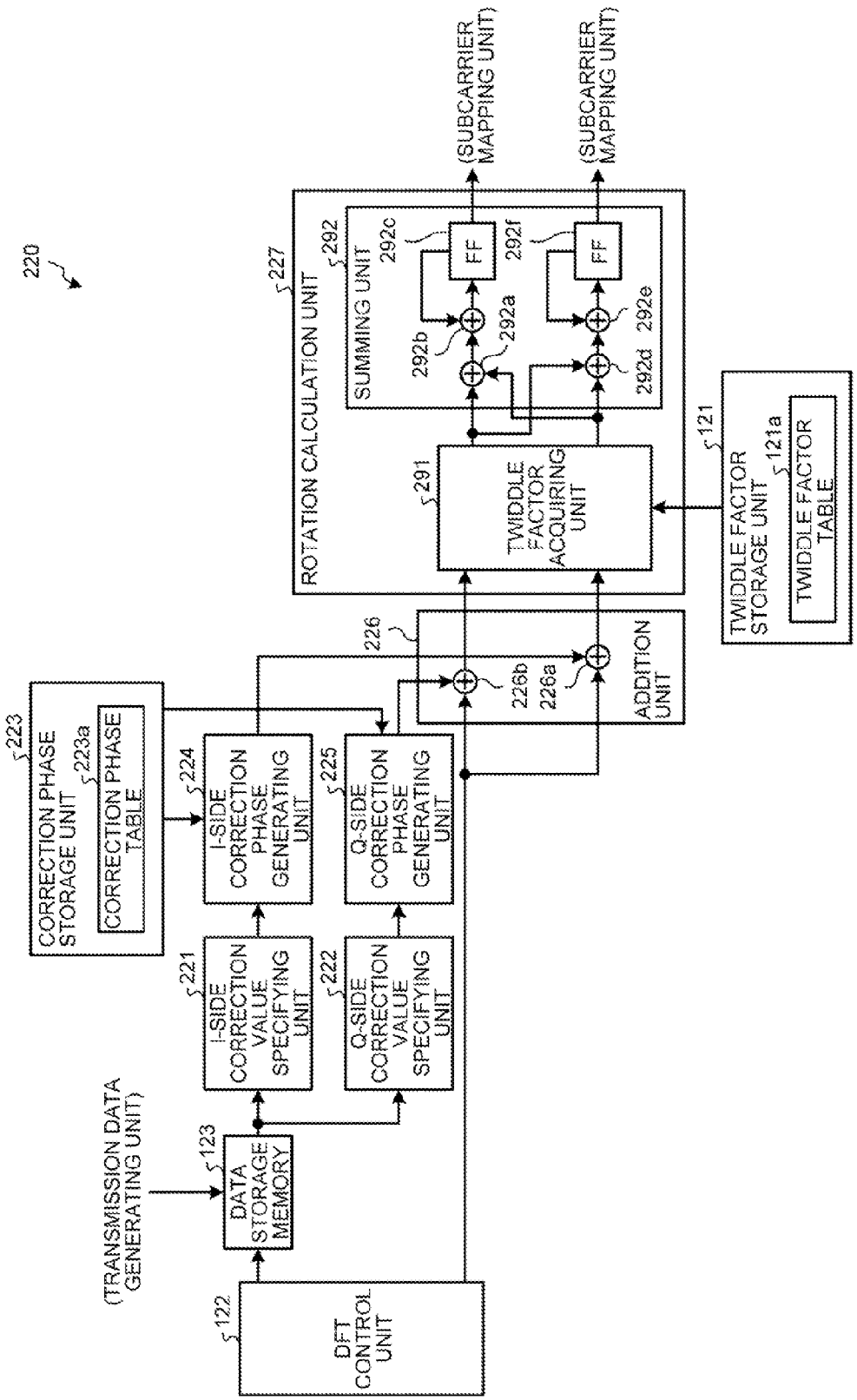
FIG. 14 is a diagram illustrating the detailed configuration of a DFT unit according to the second embodiment.

Next, the configuration of a DFT unit 220 according to the present embodiment will be explained with reference to FIG. 14. FIG. 14 is a diagram illustrating the detailed configuration of the DFT unit 220 according to the second embodiment. A block diagram of the radio communication device according to the second embodiment is illustrated by FIG. 2. A block diagram of the transmission processing unit according to the second embodiment is also illustrated by FIG. 3. Hereinafter, the same components of the second embodiment as those of the first embodiment have the same reference numbers, and thus the detailed descriptions are omitted.

As illustrated in FIG. 14, the DFT unit 220 includes the twiddle factor storage unit 121, the DFT control unit 122, the data storage memory 123, an I-side correction value specifying unit 221, a Q-side correction value specifying unit 222, and a correction phase storage unit 223. The DFT unit 220 further includes an I-side correction phase generating unit 224, a Q-side correction phase generating unit 225, an addition unit 226, and a rotation calculation unit 227.

Figures 15, 16:
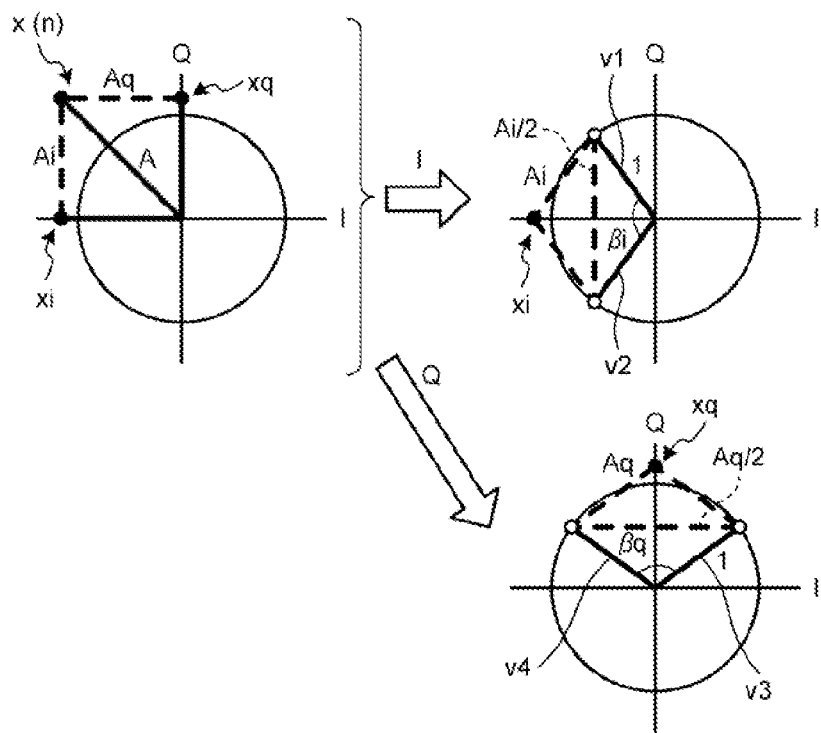
FIG. 15 is a diagram explaining a process that is performed by an I-side correction value specifying unit and a Q-side correction value specifying unit.
FIG. 16 is a diagram illustrating an example of a correction phase table.

The I-side correction value specifying unit 221 specifies first and second correction values for correcting the phase of an I value included in data of a time-domain signal input from the transmission data generating unit 110. More specifically, as illustrated in FIG. 15, the I-side correction value specifying unit 221 reads out an I value xi included in a time-domain data x(n) from the data storage memory 123. Herein, FIG. 15 is a diagram explaining a process that is performed by the I-side correction value specifying unit 221 and the Q-side correction value specifying unit 222. The I-side correction value specifying unit 221 specifies angles βi and −βi, which are formed by the vector of the I value xi and two unit vectors v1 and v2 of which the size after composition is the amplitude Ai of the I value xi included in the data x(n), as the first and second correction values, respectively. In other words, the I-side correction value specifying unit 221 specifies the arccosine value βi of the value, which is obtained by dividing the amplitude of the I value xi by a maximum amplitude value "2" of the I value xi, as the first correction value, and specifies the value −βi obtained by reversing the sign of the arccosine value as the second correction value. The arccosine value βi is expressed with the following Equation (3).

$$\beta i = \cos^{-1}\frac{|Ai|}{2} \quad (3)$$

The Q-side correction value specifying unit 222 specifies third and fourth correction values for correcting the phase of a Q value included in the data of the time-domain signal input from the transmission data generating unit 110. More specifically, as illustrated in FIG. 15, the Q-side correction value specifying unit 222 reads out a Q value xq included in the time-domain data x(n) from the data storage memory 123. The Q-side correction value specifying unit 222 specifies angles βq and −βq, which are formed by the vector of the Q value xq and two unit vectors v3 and v4 of which the size after composition is the amplitude Aq of the Q value xq included in the data x(n), as the third and fourth correction values, respectively. In other words, the Q-side correction value specifying unit 222 specifies the arccosine value βq of the value, which is obtained by dividing the amplitude of the Q value xq by the maximum amplitude value "2" of the Q value xq, as the third correction value, and specifies the value −βq obtained by reversing the sign of the arccosine value as the fourth correction value. The arccosine value βq is expressed with the following Equation (4).

$$\beta q = \cos^{-1}\frac{|Aq|}{2} \quad (4)$$

The correction phase storage unit 223 stores therein a correction phase table 223a. The correction phase table 223a is a table for converting the first to fourth correction values into the first to fourth phases corresponding to the addresses of the twiddle factor table 121a. An example of the correction phase table 223a is illustrated in FIG. 16.

As illustrated in FIG. 16, the correction phase table 223a has items such as for example an input amplitude, "β", and an address offset in association with one another. Among them, an input amplitude item indicates a value obtained by dividing the amplitude of an I value included in the time-domain data x(n) by "2". A "β" item indicates the first to fourth correction values (±βi or ±βq) for correcting the I value or the Q value of the time-domain data x(n). An address offset item indicates the first to fourth phases obtained by correcting the phase of the I value or the phase of the Q value of the time-domain data x(n) by using the first to fourth correction values. Herein, the address offset according to the present embodiment indicates values (hereinafter, "first correction address", "second correction address", "third correction address", and "fourth correction address", respectively) that are obtained by converting the first to fourth phases into the addresses of the twiddle factor table 121a.

The I-side correction phase generating unit 224 corrects the phase of the I value included in the data x(n) of the time-domain signal by using the first and second correction values specified by the I-side correction value specifying unit 221 to generate the first and second phases. More specifically, the I-side correction phase generating unit 224 receives the first and second correction values from the I-side correction value specifying unit 221. Then, the I-side correction phase generating unit 224 generates the first and second correction addresses corresponding to the first and second correction values with reference to the correction phase table 223a of the correction phase storage unit 223. Then, the I-side correction phase generating unit 224 outputs the generated first and second correction addresses to the addition unit 226.

The Q-side correction phase generating unit 225 corrects the phase of the Q value included in the data x(n) of the time-domain signal by using the third and fourth correction values specified by the Q-side correction value specifying unit 222 to generate the third and fourth phases. More specifically, the Q-side correction phase generating unit 225 receives the third and fourth correction values from the Q-side correction value specifying unit 222. Then, the Q-side correction phase generating unit 225 generates the third and fourth correction addresses corresponding to the third and fourth correction values with reference to the correction phase table 223a of the correction phase storage unit 223. Then, the Q-side correction phase generating unit 225 outputs the generated third and fourth correction addresses to the addition unit 226.

The addition unit 226 includes an I-side adder 226a and a Q-side adder 226b. The I-side adder 226a receives the first and second correction addresses from the I-side correction phase generating unit 224. The I-side adder 226a receives an arbitrary address from the DFT control unit 122. Then, the I-side adder 226a adds the arbitrary address to each of the first and second correction addresses. Then, the I-side adder 226a outputs the first and second correction addresses after addition of the arbitrary address to the rotation calculation unit 227.

The Q-side adder 226b receives the third and fourth correction addresses from the Q-side correction phase generating unit 225. The Q-side adder 226b receives the arbitrary address from the DFT control unit 122. Then, the Q-side adder 226b adds the arbitrary address to each of the third and fourth correction addresses. Then, the Q-side adder 226b outputs the third and fourth correction addresses after addition of the arbitrary address to the rotation calculation unit 227.

The rotation calculation unit 227 includes a twiddle factor acquiring unit 291 and a summing unit 292. The twiddle factor acquiring unit 291 receives the first and second correction addresses after addition of the arbitrary address from the I-side adder 226a of the addition unit 226. The twiddle factor acquiring unit 291 then acquires first and second twiddle factors corresponding to the first and second correction addresses after addition of the arbitrary address from the twiddle factor table 121*a*. Then, the twiddle factor acquiring unit 291 outputs I values of the first and second twiddle factors to an adder 292*a* of the summing unit 292 to be described below and outputs Q values of the first and second twiddle factors to an adder 292*d* of the summing unit 292 to be described below.

The twiddle factor acquiring unit 291 further receives the third and fourth correction addresses after addition of the arbitrary address from the Q-side adder 226*b* of the addition unit 226. The twiddle factor acquiring unit 291 then acquires third and fourth twiddle factors corresponding to the third and fourth correction addresses after addition of the arbitrary address from the twiddle factor table 121*a*. Then, the twiddle factor acquiring unit 291 outputs I values of the third and fourth twiddle factors to the adder 292*a* of the summing unit 292 and outputs Q values of the third and fourth twiddle factors to the adder 292*d* of the summing unit 292.

The summing unit 292 sums the first to fourth twiddle factors acquired by the twiddle factor acquiring unit 291 to acquire a twiddle factor X(k) for the time-domain signal input from the transmission data generating unit 110. More specifically, the summing unit 292 includes the adder 292*a*, an adder 292*b*, a flip-flop circuit 292*c*, the adder 292*d*, an adder 292*e*, and a flip-flop circuit 292*f*.

The adder 292*a* receives the I values of the first and second twiddle factors from the twiddle factor acquiring unit 291. The adder 292*a* receives the I values of the third and fourth twiddle factors from the twiddle factor acquiring unit 291. Then, the adder 292*a* adds the I values of the first and second twiddle factors and the I values of the third and fourth twiddle factors and outputs the result to the adder 292*b*.

The adder 292*b* receives the I value at a time "t" from the adder 292*a*. The adder 292*b* receives the I value at a time "t−1" from the flip-flop circuit 292*c*. Then, the adder 292*b* adds the I value at the time "t−1" to the I value at the time "t" and outputs the result to the flip-flop circuit 292*c*. The flip-flop circuit 292*c* saves the I value at the time "t−1" input from the adder 292*b* until the adder 292*b* receives the I value at the time "t". When the adder 292*b* receives the I value at the time "t", the flip-flop circuit 292*c* outputs the I value at the time "t−1" to the subcarrier mapping unit 130.

The adder 292*d* receives the Q values of the first and second twiddle factors from the twiddle factor acquiring unit 291. The adder 292*d* receives the Q values of the third and fourth twiddle factors from the twiddle factor acquiring unit 291. Then, the adder 292*d* adds the Q values of the first and second twiddle factors and the Q values of the third and fourth twiddle factors and outputs the result to the adder 292*e*.

The adder 292*e* receives the Q value at the time "t" from the adder 292*d*. The adder 292*e* receives the Q value at the time "t−1" from the flip-flop circuit 292*f*. Then, the adder 292*e* adds the Q value at the time "t−1" to the Q value at the time "t" and outputs the result to the flip-flop circuit 292*f*. The flip-flop circuit 292*f* saves the Q value at the time "t−1" input from the adder 292*e* until the adder 292*e* receives the Q value at the time "t". When the adder 292*e* receives the Q value at the time "t", the flip-flop circuit 292*f* outputs the Q value at the time "t−1" to the subcarrier mapping unit 130.

Next, the routine of a discrete Fourier calculation process that is performed by the DFT unit 220 according to the second embodiment will be explained with reference to FIG. 17. FIG. 17 is a flowchart illustrating the routine of a discrete Fourier calculation process that is performed by the DFT unit 220 according to the second embodiment. Because the routine of Steps S201 to S204 illustrated in FIG. 17 is similar to that of Steps S101 to S104 illustrated in FIG. 12, their descriptions are omitted.

As illustrated in FIG. 17, the I-side correction value specifying unit 221 reads out an I value included in a time-domain data x(n) from the data storage memory 123 (Step S205). Next, the I-side correction value specifying unit 221 specifies an arccosine value of the value obtained by dividing the amplitude of the I value by the maximum amplitude value "2" of the I value as a first correction value and specifies a value obtained by reversing the sign of the arccosine value as a second correction value (Step S206). The I-side correction value specifying unit 221 then outputs the specified first and second correction values to the I-side correction phase generating unit 224. The I-side correction phase generating unit 224 that receives the first and second correction values refers to the correction phase table 223*a*. Then, the I-side correction phase generating unit 224 acquires first and second correction addresses corresponding to the first and second correction values from the correction phase table 223*a* to generate the first and second correction addresses (Step S207). Then, the I-side correction phase generating unit 224 outputs the generated first and second correction addresses to the addition unit 226.

On the other hand, the Q-side correction value specifying unit 222 reads out a Q value included in the time-domain data x(n) from the data storage memory 123 (Step S208). Next, the Q-side correction value specifying unit 222 specifies an arccosine value of the value obtained by dividing the amplitude of the Q value by the maximum amplitude value "2" of the Q value as a third correction value and specifies a value obtained by reversing the sign of the arccosine value as a fourth correction value (Step S209). The Q-side correction value specifying unit 222 then outputs the specified third and fourth correction values to the Q-side correction phase generating unit 225. The Q-side correction phase generating unit 225 that receives the third and fourth correction values refers to the correction phase table 223*a*. Then, the Q-side correction phase generating unit 225 acquires third and fourth correction addresses corresponding to the third and fourth correction values from the correction phase table 223*a* to generate the third and fourth correction addresses (Step S210). Then, the Q-side correction phase generating unit 225 outputs the generated third and fourth correction addresses to the addition unit 226.

The addition unit 226 that receives the first to fourth correction addresses and an arbitrary address adds the arbitrary address to the first to fourth correction addresses (Step S211). Then, the I-side adder 226*a* of the addition unit 226 outputs the first and second correction addresses after addition of the arbitrary address to the rotation calculation unit 227. Then, the Q-side adder 226*b* of the addition unit 226 outputs the third and fourth correction addresses after addition of the arbitrary address to the rotation calculation unit 227.

Then, the twiddle factor acquiring unit 291 of the rotation calculation unit 227 acquires first and second twiddle factors corresponding to the first and second correction addresses after addition of the arbitrary address from the twiddle factor table 121*a*. The twiddle factor acquiring unit 291 further acquires third and fourth twiddle factors corresponding to the third and fourth correction addresses after addition of the arbitrary address from the twiddle factor table 121*a* (Step S212). Then, the twiddle factor acquiring unit 291 outputs I values of the first and second twiddle factors to the adder 292*a* of the summing unit 292 and outputs Q values of the first and second twiddle factors to the adder 292*d* of the summing unit 292. Furthermore, the twiddle factor acquiring unit 291 outputs I values of the third and fourth twiddle factors to the adder 292a of the summing unit 292 and outputs Q values of the third and fourth twiddle factors to the adder 292d of the summing unit 292.

Next, the summing unit 292 sums the first to fourth twiddle factors acquired by the twiddle factor acquiring unit 291 (Step S213). As a result, a rotation calculation result X(k) for the time-domain signal input from the transmission data generating unit 110 is obtained.

Next, the DFT control unit 122 increments a time-domain sample number "n" (Step S214). The DFT control unit 122 repeatedly performs the routine of Steps S204 to S214 when "n" is smaller than the size of DFT (Step S215: YES).

On the other hand, the DFT control unit 122 moves the routine to Step S216 when "n" is not less than the size of DFT (Step S215: NO). Then, the summing unit 292 outputs the rotation calculation result X(k) to the subcarrier mapping unit 130 (Step S216) and clears the flip-flop circuits 292c and 292f (Step S217).

Next, the DFT control unit 122 increments a frequency-domain sample number "k" (Step S218). Then, the DFT control unit 122 repeatedly performs the routine of Steps S203 to S218 when "k" is smaller than the size of DFT (Step S219: YES). On the other hand, the DFT control unit 122 terminates the process when "k" is not less than the size of DFT (Step S219: NO).

As described above, the radio communication device according to the second embodiment adds an arbitrary phase to four phases obtained by correcting the phases of an I value and a Q value included in an input signal. Then, the radio communication device acquires four twiddle factors corresponding to the four phases after addition of the arbitrary phase from the one twiddle factor table 121a and sums the four twiddle factors to acquire the calculation result on the DFT process. For this reason, according to the present embodiment, because the Fourier transform process can be performed by saving only one twiddle factor table even when the amplitude and phase of the input signal is unknown, the increase of a circuit scale can be suppressed.

As described above, according to an aspect of embodiments of the present invention, the increase of a circuit scale can be suppressed even when the amplitude of an input signal is not constant.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A discrete Fourier calculation device comprising:
a twiddle factor table storage that stores therein a twiddle factor table that associates twiddle factors placed on a circumference of a unit circle on a complex plane with phases of the corresponding twiddle factors;
a correction value specifier circuit that specifies first and second correction values for correcting a phase of an input signal in accordance with an amplitude of the input signal;
a generator circuit that corrects the phase of the input signal by using the specified first and second correction values to generate first and second phases;
an adder circuit that adds an arbitrary phase, which is a phase corresponding to an arbitrary twiddle factor stored in the twiddle factor table, to each of the generated first and second phases; and
a rotation calculator circuit that acquires, from the twiddle factor table, first and second twiddle factors corresponding to the first and second phases to each of which the arbitrary phase is added by the addition unit and sums the acquired first and second twiddle factors to acquire a rotation calculation result on the input signal.

2. The discrete Fourier calculation device according to claim 1, wherein the correction value specifier circuit specifies an arccosine value of a value obtained by dividing the amplitude of the input signal by "2" as the first correction value and specifies a value obtained by reversing a sign of the arccosine value as the second correction value.

3. The discrete Fourier calculation device according to claim 1, further comprising a determiner circuit that determines whether the amplitude of the input signal is constant, wherein
the generator circuit generates a third phase by using the phase of the input signal when the amplitude of the input signal is constant,
the adder circuit adds an arbitrary phase, which is a phase corresponding to an arbitrary twiddle factor stored in the twiddle factor table, to the generated third phase, and
the rotation calculator circuit acquires, from the twiddle factor table, a third twiddle factor corresponding to the third phase to which the arbitrary phase is added by the addition unit and sums the acquired third twiddle factor to acquire a rotation calculation result on the input signal.

4. A discrete Fourier calculation device comprising:
a twiddle factor table storage that stores therein a twiddle factor table that associates twiddle factors placed on a circumference of a unit circle on a complex plane with phases of the corresponding twiddle factors;
an I-side correction value specifier circuit that specifies first and second correction values for correcting a phase of an I value in an input signal, the input signal including the I value that is a value on a real number axis of the complex plane and a Q value that is a value on an imaginary number axis of the complex plane;
an I-side correction phase generator circuit that corrects the phase of the I value by using the specified first and second correction values to generates first and second phases;
a Q-side correction value specifier circuit that specifies third and fourth correction values for correcting a phase the Q value in the input signal;
a Q-side correction phase generator circuit that corrects the phase of the Q value by using the specified third and fourth correction values to generate third and fourth phases;
an adder circuit that adds an arbitrary phase, which is a phase corresponding to an arbitrary twiddle factor stored in the twiddle factor table, to each of the generated first to fourth phases; and
a rotation calculator circuit that acquires, from the twiddle factor table, first to fourth twiddle factors corresponding to the first to fourth phases to each of which the arbitrary phase is added by the addition unit and sums the acquired first to fourth twiddle factors to acquire a rotation calculation result on the input signal.

5. The discrete Fourier calculation device according to claim 4, wherein
- the I-side correction value specifier circuit specifies an arccosine value of a value obtained by dividing an amplitude of the I value by a maximum amplitude value of the I value as the first correction value and specifies a value obtained by reversing a sign of the arccosine value as the second correction value, and
- the Q-side correction value specifier circuit specifies an arccosine value of a value obtained by dividing an absolute value of the Q value by a maximum amplitude value of the Q value as the third correction value and specifies a value obtained by reversing a sign of the arccosine value as the fourth correction value.

6. A radio communication device comprising a discrete Fourier calculation device,
- the discrete Fourier calculation device comprising:
- a twiddle factor table storage that stores therein a twiddle factor table that associates twiddle factors placed on a circumference of a unit circle on a complex plane with phases of the corresponding twiddle factors;
- a phase correction value specifier circuit that specifies first and second correction values for correcting a phase of an input signal in accordance with an amplitude of the input signal;
- a generator circuit that corrects the phase of the input signal by using the specified first and second correction values to generate first and second phases;
- an adder circuit that adds an arbitrary phase, which is a phase corresponding to an arbitrary twiddle factor stored in the twiddle factor table, to the generated first and second phases; and
- a rotation calculator circuit that acquires, from the twiddle factor table, first and second twiddle factors corresponding to the first and second phases to each of which the arbitrary phase is added by the addition unit and sums the acquired first and second twiddle factors to acquire a rotation calculation result on the input signal.

7. A discrete Fourier calculation method that is executed by a discrete Fourier calculation device that includes a twiddle factor table storage that stores therein a twiddle factor table that associates twiddle factors placed on a circumference of a unit circle on a complex plane with phases of the corresponding twiddle factors, the discrete Fourier calculation method comprising:
- specifying, by a specifier circuit, first and second correction values for correcting a phase of an input signal in accordance with an amplitude of the input signal;
- correcting, by a generator circuit, the phase of the input signal by using the specified first and second correction values to generate first and second phases;
- adding, by an adder circuit, an arbitrary phase, which is a phase corresponding to an arbitrary twiddle factor stored in the twiddle factor table, to the generated first and second phases;
- acquiring, by a rotation calculator circuit, from the twiddle factor table, first and second twiddle factors corresponding to the first and second phases to each of which the arbitrary phase is added at the adding; and
- summing, by the rotation calculator circuit, the acquired first and second twiddle factors to acquire a rotation calculation result on the input signal.

\* \* \* \* \*